United States Patent
Badge et al.

(10) Patent No.: US 10,462,227 B2
(45) Date of Patent: Oct. 29, 2019

(54) ENHANCED PRIVACY AND AGENT CONTROL IN A CO-BROWSING SESSION

(71) Applicant: Avaya Inc., Basking Ridge, NJ (US)

(72) Inventors: Gaurav Badge, Pune (IN); Ramanujan S. Kashi, Bangalore (IN); Biswajyoti Pal, Maharashtra (IN)

(73) Assignee: Avaya Inc., Basking Ridge, NJ (US)

( * ) Notice: Subject to any disclaimer, the term of this patent is extended or adjusted under 35 U.S.C. 154(b) by 350 days.

(21) Appl. No.: 14/576,089

(22) Filed: Dec. 18, 2014

(65) Prior Publication Data

US 2016/0182643 A1   Jun. 23, 2016

(51) Int. Cl.
*H04L 29/08* (2006.01)
*G06F 16/954* (2019.01)
*H04L 29/06* (2006.01)

(52) U.S. Cl.
CPC .......... *H04L 67/141* (2013.01); *G06F 16/954* (2019.01); *H04L 63/10* (2013.01)

(58) Field of Classification Search
CPC ...... H04L 67/141; H04L 63/10; G06F 16/954
See application file for complete search history.

(56) References Cited

U.S. PATENT DOCUMENTS

| 2014/0164934 A1* | 6/2014 | Yang | G06F 17/3089 715/738 |
| 2015/0067181 A1* | 3/2015 | Roy | H04L 67/1095 709/227 |

OTHER PUBLICATIONS

IEEE, "The Authoritative Dictionary of IEEE Standards Terms", Seventh Edition, 3 pages, 2000 (Year: 2000).*

* cited by examiner

*Primary Examiner* — Jeffrey D. Popham

(57) ABSTRACT

Embodiments described herein provide systems and method for implementing privacy control in a co-browsing environment. In a particular embodiment, a method provides receiving an instruction in a co-browsing server to initiate a co-browsing session for a website with a first client and a second client. The method further provides receiving first privacy settings from the first client, wherein the first privacy settings indicate how the website should be presented at the second client. The method further provides presenting the website at the first client and presenting the website at the second client based on the first privacy settings.

20 Claims, 10 Drawing Sheets www.examplebank.com/create_account

Example Bank

Email Address

First Name

Last Name

Street Address

City, State, Zip

Phone Number

Social Security Number

Date of Birth  mm/dd/yyyy

Citezenship  Select a Country

☐ I have read and agree to the terms of service.

SUBMIT

CANCEL

Click here to end co-browsing session

Example Bank

| | | |
|---|---|---|
| Email Address | jdoe@email | *(Agent)* |
| First Name | John | *(Agent)* |
| Last Name | Doe | *(Agent)* |
| Street Address | 123 Elm Street | |
| City, State, Zip | Springfield  CO  11111 | |
| Phone Number | 303-555-1234 | |
| Social Security Number | 555-55-5555 | |
| Date of Birth | 01 / 01 / 1980  mm/dd/yyyy | |
| Citizenship | United States ▸ | |

*(Agent)* ☑ I have read and agree to the terms of service.

[ CANCEL ]  [ SUBMIT ]

Click here to end co-browsing session www.examplebank.com/create_account

ENHANCED PRIVACY AND AGENT CONTROL IN A CO-BROWSING SESSION

TECHNICAL BACKGROUND

Modern websites allow a user to accomplish a myriad of tasks online from the user's computing device whether the device be a laptop, desktop, smartphone, tablet, or otherwise. These tasks may include retrieving information, purchasing items, creating content, communicating with other users, or any other online activity. While a website allows a user to accomplish one or more tasks, the website does not allow for multiple users to have the same experience without those users present at the same computing device.

To address the above issue, co-browsing systems exist that allow multiple devices to view interactions with a website across the multiple devices. However, in some situations, a user on a co-browsing session may not want other users on the co-browsing session to interact with the website being presented in the session. For example, the website may include a form requesting information from one of the user's and that user may not want other users on the co-browsing session to enter that information on their behalf.

OVERVIEW

Embodiments described herein provide systems, methods, and computer readable storage media for enhancing privacy and agent control in a co-browsing session. In a particular embodiment, a non-transitory computer readable storage medium having instructions stored thereon is provided. The instructions direct the co-browsing system to perform a method that provides establishing a co-browsing session for a website with a first client device and a second client device. The method further provides receiving first permission from the first client device allowing input from the second client device to be presented on the website at the first client device and, after receiving the first permission, receiving first input from the second client device. The method provides applying an indication of the first input to the website for presentation at the first client device.

In some embodiments, the method further provides receiving second permission from the first client device allowing input from the second client device to interact with the website on behalf of the first client device and, after receiving the second permission, receiving second input from the second client device.

In some embodiments, the method further provides applying the second input to the website for presentation at the first client device.

In some embodiments, the second input comprises text entered into a field of the website.

In some embodiments, the second input comprises selection of a selectable element of the website.

In some embodiments, the method further provides, if the selection of the selectable element constitutes a form of data submission, querying a user of the first client device for authorization of the second input and, upon receiving the authorization, applying the second input to the website.

In some embodiments, the method further provides, if the selection of the selectable element performs an action that directs to another domain, providing a preview of the action to a user of the first client device and querying the user for authorization of the second input and, upon receiving the authorization, applying the second input to the website.

In some embodiments, the method further provides, after receiving the second permission, receiving a revocation of at least the second permission from the first client device.

In some embodiments, the first input comprises positioning of a graphical indicator over at least a portion of the website.

In some embodiments, the first input comprises highlighting at least a portion of the website.

In another embodiment, a co-browsing system configured to perform a method of facilitating control in a co-browsing session is provided. The co-browsing system includes a processing system configured to establish a co-browsing session for a website with a first client device and a second client device. The co-browsing system further includes a communication interface configured to receive first permission from the first client device allowing input from the second client device to be presented on the website at the first client device. After receiving the first permission, the processing system is further configured to receive first input from the second client device and apply an indication of the first input to the website for presentation at the first client device.

BRIEF DESCRIPTION OF THE DRAWINGS

FIG. 7 illustrates a browser window for implementing privacy and control in a co-browsing session.

FIG. 9 illustrates a browser window for implementing privacy and control in a co-browsing session.

FIG. 10 illustrates a browser window for implementing privacy and control in a co-browsing session.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
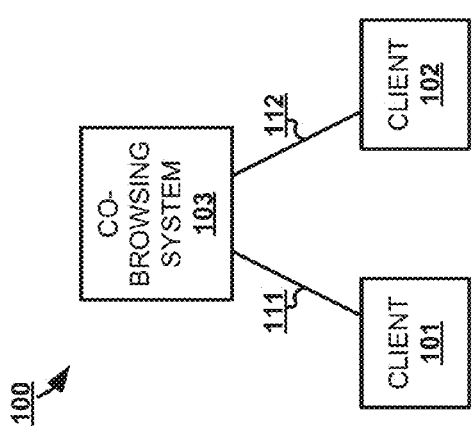
FIG. 1 illustrates a co-browsing environment for implementing privacy and control in a co-browsing session.

FIG. 1 illustrates co-browsing environment 100. Co-browsing environment 100 includes client device 101, client device 102, and co-browsing system 103. Client device 101 and co-browsing system 103 communicate over communication link 111. Client device 102 and co-browsing system 103 communicate over communication link 112.

In operation, client devices 101 and 102 are computing devices, such as laptop computers, desktop computers, tablet computers, and smartphones that are capable of presenting websites to their respective users. Instead of receiving a particular website directly from a server of that website, client devices 101 and 102 receive the website through co-browsing system 103. Specifically, co-browsing system 103 allows both client devices to present the same website at each of client devices 101 and 102. Users at each of client devices 101 and 102 are therefore ensured to be viewing the same website content.

Client software may be executing on each of client devices 101 and 102 in order to cooperate with co-browsing system 103. The client software may be executing within a web browsing application on client devices 101 and 102 or may be independent applications including combinations thereof. The client software may be installed as extensions or plugins within a web browser or may be transferred from co-browsing system 103 as needed. The client software may be written in a web standard, such as HTML 5 or Java, so that a web browser on a device does not require additional plugins or extensions in order to execute the client software. Alternatively, the client software may comprise a stand-alone application or take some other form depending on the co-browsing platform used by co-browsing system 103.

Figure 2:
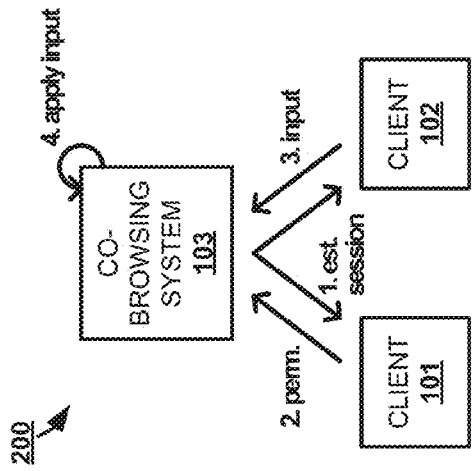
FIG. 2 illustrates an operational scenario of a co-browsing environment for implementing privacy and control in a co-browsing session.

In some embodiments, client devices 101 and 102 each render the website separately for display while in other embodiments co-browsing system 103 renders the website and transfers a rendered image of the website to client devices 101 and 102 for display. Other methods of performing a co-browsing session may also be used. Client devices 101 and 102 exchange communication with co-browsing system 103 to synchronize website interactions across client devices 101 and 102. For example, if a user types information into the website on client device 101, that information will also show as being entered into the website on client device 102. However, a user of one client device may not want a user of the other client device to FIG. 2 illustrates operational scenario 200 of co-browsing system 100 for implementing privacy and control in a co-browsing session. In scenario 200, step 1 establishes a co-browsing session between co-browsing system 103 and client devices 101 and 102. Establishment of the co-browsing session may have been initiated by either of client devices 101 and 102 and may be initiated in response to user input directing at least one of the client devices to do so. The website that is the subject of the co-browsing session is received from a web server by co-browsing system 103 for presentation at the client devices 101 and 102. Although, in some cases, the functionality of co-browsing system 103 may be incorporated into the web server that provides the website.

At step 2, permission is received from client device 101 allowing input from client device 102 to be presented on the website at the client device 102. The permission may be received before the co-browsing session is established, during establishment of the session, or after the session is established. A user of client device 101 may be queried for the permission either by co-browsing system 103 or client device 101, may be preset by the user in client software preferences, or any other way in which client device 101 may be instructed to provide the permission. Without the permission, client device 102 is only able to view the website while client device 101 is able to interact with the website. For example, if a customer is a client device 101 and an customer service agent of some type is at client device 102, only the agent can only view the website without the customer using client device 101 to grant permission for the agent to do more.

The permission may grant varying levels of input to be applied to the website. At a lower level of permissions, the permission may grant cursor movement input, or other type of position indicator input, from the client device 102. Additionally, the permission may allow input that highlights areas of the website or otherwise indicates a larger area of the website than can be indicated by cursor position. In some embodiments, higher levels of permission may also be granted either along with the permissions at step 2 or during a different grant of permission from client device 101. Higher-level permissions may grant control over the website to client device 102, such as the ability to enter text into the website, select links or buttons, or some other type of input that the website can accept.

After receiving the first permission, input from client device 102 is received at step 3. The input comprises user input related to the website in the co-browsing session as captured by client device 102. Input outside of the co-browsing session is not transferred by client device 102 to the co-browsing system 103. In some examples, client device 102 made aware of the permission granted by client device 101 and, therefore, only transfers input not n violation of that permission to co-browsing server 103.

As long as the input does not violate the permission granted by client device 101, an indication of the input is applied at step 4 the website for presentation at client device 101. The input may be applied in any way that conveys the input from client device 102 to a user of client device 101 when presented with the website at client device 101. For example, co-browsing system 103 may transfer information describing the position of client device 102's cursor to client device 101 and client device 101 uses the information to present the cursor's position on the website. Advantageously, the user of client device 102, such as a customer service agent, can use input to better remotely assist a user of client device 101, such as a customer.

Figure 3:
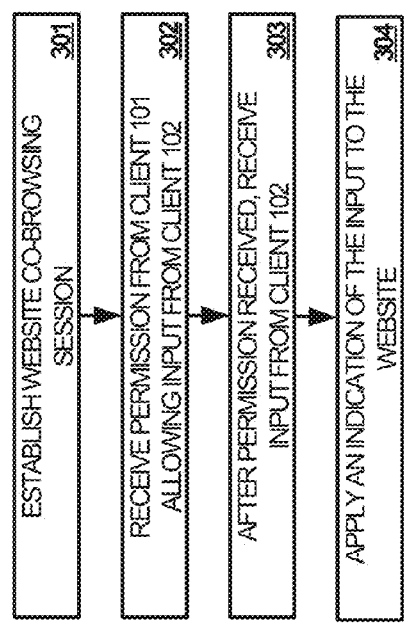
FIG. 3 illustrates a method of operating a co-browsing environment for implementing privacy and control in a co-browsing session.

FIG. 3 illustrates a method 300 of operating of co-browsing environment 100 for implementing privacy and control in a co-browsing session. Method 300 provides establishing a co-browsing session for a website with client device 101 and client device 102 (step 301). A user of either client device 101 or 102 may initiate establishment of the session. For example, a link in the website may be selected in order to establish a co-browsing session for the website through co-browsing system 103.

Method 300 also provides receiving permission from client device 101 allowing input from client device 102 to be presented on the website at client device 101 (step 302). The permission allows client device 102 to do more than simply present the website to a user of client device 102. In this example, the permission may allow a user of client device 102 to indicate areas on the website to a user of client device 101, with a cursor, highlighting, or otherwise, but so not allow data entry or other control of the website.

After receiving the permission, method 300 provides receiving input from client device 102 (step 303) and applying an indication of the input to the website for presentation at client device 101 (step 304). In a particular example, if the user of client device 102 places their cursor over a particular feature of the website, then that cursor input is transferred to and received by co-browsing system 103. Co-browsing system 103 in turn performs any necessary actions to apply that input to the presentation of the website at client device 101 (e.g. transferring information describing the cursor location on the website to client device 101). From those actions therefore allow client device 101 to present an indicator of the cursor location, such as cursor graphic designated as client device 102's cursor, on the display of the website at client device 101.

As input continues to be received by co-browsing system 103 from client device 102, that input is also applied to the website for presentation at client device 101 as long as the permission to do so remains in place. Accordingly, stemming from the example above, as the user of client device 102 moves the cursor to various area on the webpage, those cursor movements are also displayed, in near real time, on the website presented at client device 101.

In some embodiments, method 300 further includes receiving additional permission from client device 101 allowing input from client device 102 to interact with the website on behalf of client device 101. This additional permission may be received along with the permission received at step 302 or may be received separately. The additional permission may allow the user of client device 102 to provide input into data entry fields of the website, may allow the user of client device 102 to select links of the website, or other types of possible interactions with websites—including combinations thereof. In one example, a user of client device 101 may first give the permission at step 302 and then decide that they want the user of device 102 to have control over the website and grants the additional permission accordingly.

After receiving the additional permission, input received from client device 102 that complies with that additional permission is applied to the website. For example, the additional permission may allow data entry. Thus, if the input enters text into a text field, then that text is applied to the website on behalf of client device 101. In a similar example, the additional permission may further allow the input to select links, buttons, or other type of selectable element on the website. Thus, if the input selects a link, then the link selection is applied to the website for presentation at client device 101, which may include moving to another page of the website.

In some cases, the user of client device 101 may be asked to authorize the actions taken by the input from client device 102 before that input is applied to the website. For example, if the input selects a data submission button, then the user of client device 101 may need to confirm that the data being submitted is correct. Likewise, if the input selects a link to another webpage, then the user of client device 101 may also need to authorize the progression to that other webpage. In some cases, co-browsing system 103 may provide a preview of the other webpage to aid the user of device 101 in determining whether to authorize the input. Additionally, the co-browsing system 103 may warn the user of device 101 if the other webpage is outside of the domain for the website and, therefore, is not under the control of co-browsing system 103. Progression to another domain in that manner may also end the co-browsing session.

In some embodiments, at any time after receiving one or more permissions, co-browsing system 103 may receive a revocation of any one of the permissions. For example, the revocation may apply only to the additional permission or also to the permission received at step 302. The permission received at step 302 may also be revoked separately at a different time. In all likelihood, based on the nature of the permissions, the permission received at step 302 cannot be revoked without also revoking the additional permission, while the same is not true for the opposite. As long as the appropriate permission remains in place during the co-browsing session, input received from client device 102 and complying with the permission will be applied to the website as presented at client device 101.

It should be understood that the embodiments described above may be applied to co-browsing sessions between more than two client devices. The permissions may therefore allow multiple client devices to apply inputs to a website being presented at one or more other client devices. Moreover, the type of permission granted to each client device may differ among the client devices. For example, one client device may be granted permission to show its cursor on the website while another client device may further be granted permission to control or interact with the website. Additionally, while the embodiments described above only provide two different variations on permissions, additional types of permissions may also be granted or revoked in a similar manner.

Additionally, in many embodiments, client device 101 and client device 102 may be different types of devices that display websites differently. For example, a smartphone may display a webpage differently than a desktop computer. In those cases, co-browsing system 103 may replicate how the website is displayed on one device for display on the other device. Thus, the users at each client device 101 and 102 are guaranteed to be viewing the same presentation of the webpage. For instance, if a customer at client device 101 is on a smartphone, then an agent at client device 102 is viewing the webpage in the same way the webpage is displayed to the customer. Moreover, the view replication may also replicate any changes to device orientation maintain consistency (e.g. presentation of the webpage may change from portrait to landscape if a phone is turned on its side while presenting the webpage).

Similarly, a user may switch devices in the middle of a co-browsing session. For example, a user at client device 101 may need to leave their desktop computer and, therefore, transfers the co-browsing session to a smartphone. This may be performed in many ways. One example is that the user logs into the co-browsing session from the new client device. In some cases, a prompt on the previous device will request confirmation before the session is transferred. Once transferred, the view of the webpage on the new device can be replicated in place of the old device's view.

Referring back to FIG. 1, client devices 101 and 102 each comprise computer processing circuitry and communication circuitry. The communication circuitry may be wireless, wireline, or both. Client devices 101 and 102 may each also include a user interface, memory device, software, or some other communication components. Client devices 101 and 102 may each be a telephone, computer, e-book, mobile Internet appliance, media player, game console, or some other computing apparatus—including combinations thereof.

Co-browsing system 103 comprises a computer system and a communication interface. Co-browsing system 103 may also include other components such a router, data storage system, and power supply. Co-browsing system 103 may reside in a single device or may be distributed across multiple devices.

Communication links 111-112 use metal, glass, air, space, or some other material as the transport media. Communication links 111-112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-112 could be direct links or may include intermediate networks, systems, or devices.

Figure 4:
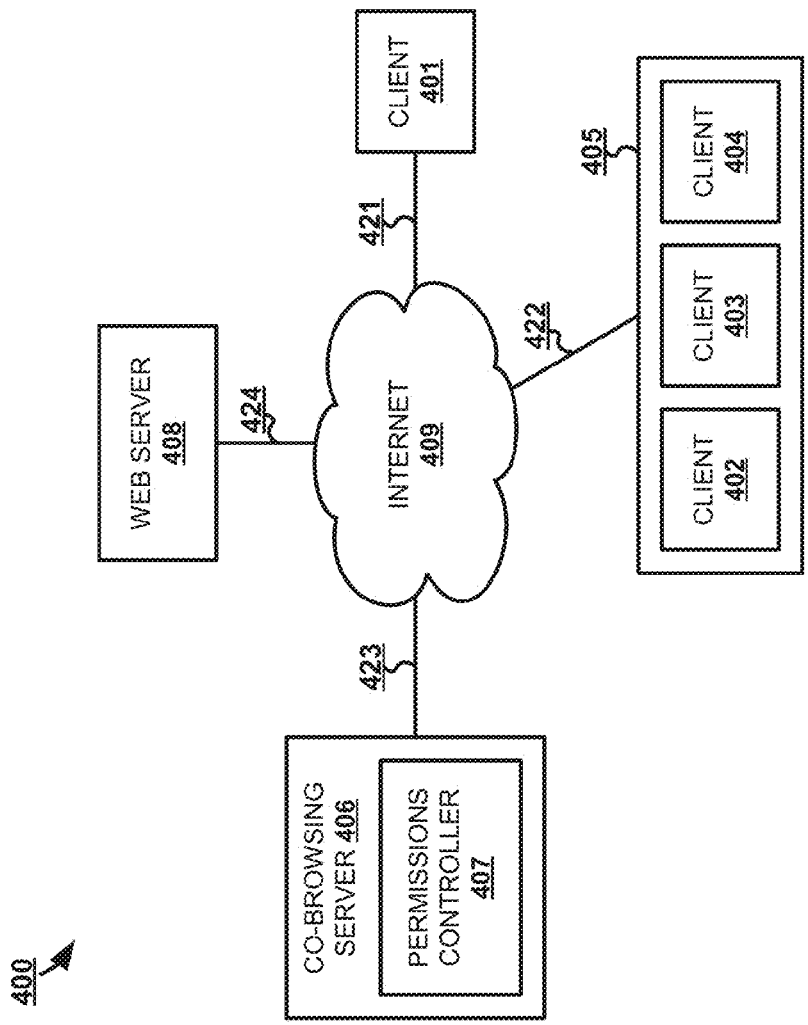
FIG. 4 illustrates a co-browsing environment for implementing privacy and control in a co-browsing session.

FIG. 4 illustrates co-browsing environment 400. Co-browsing environment 400 includes client 401, client devices 402-404 located within support center 405, co-browsing server 406, web server 408, and Internet 409. Co-browsing server 406 includes permissions controller 407. Client device 401 and Internet 409 communicate over communication link 421. Support center 405 and Internet 409 communicate over communication link 422. Co-browsing server 406 and Internet 409 communicate over communication link 423. Web server 408 and Internet 409 communicate over communication link 424.

Web server 408 comprises a computer system and communication interface. Web server 408 may also include other components such a router, data storage system, power supply, and any further components that may be used for providing websites to web browsing applications. Web server 408 may reside in a single device or may be distributed across multiple devices.

While shown separately, web server 408 and co-browsing server 406 may be incorporated within one another or may be collocated such that they communicate over a local area network rather than Internet 408. Similarly, support center 405 and either web server 408, co-browsing server 406, or both may be collocated. Alternatively, support center 405 may be a virtual center with client devices 402-404 distributed in multiple locations and accessing Internet 409 on separate links. Additionally, client device 401, support center 405, co-browsing server 406, web server 408 may access Internet 409 through one or more access providers.

In operation, agents operate client devices 402-404 to assist customers or, some other type of user, with issues that the customer may have. In some embodiments, support center 405 may be associated with an entity from which the customer requires support. For example, web server 408 may include a website for a company and support center 405 provides support to customers using the company's website. If necessary, co-browsing server 406 may be used for an agent operating one of client devices 402-404 to provide the customer with website support.

Figure 5:
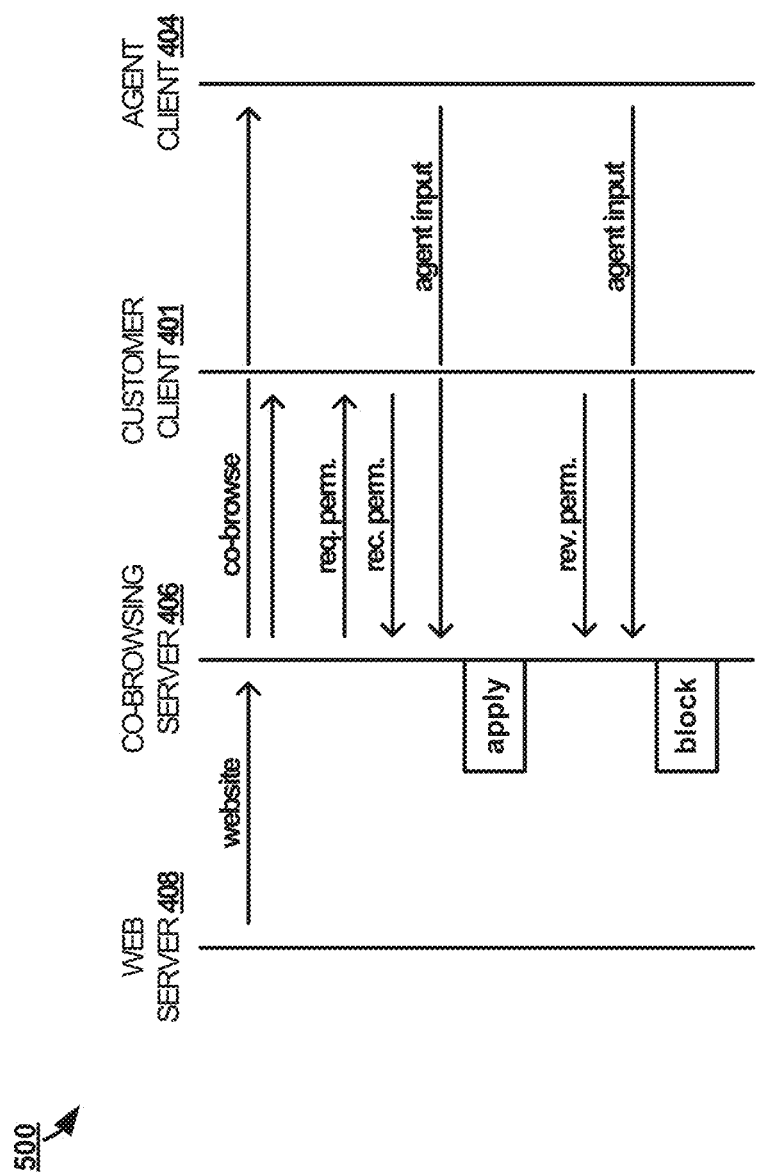
FIG. 5 illustrates an operational scenario of a co-browsing environment for implementing privacy and control in a co-browsing session.

FIG. 5 illustrates operational scenario 500 for co-browsing environment 400 to implement privacy and control in a co-browsing session. A customer that is operating client 401 desires to participate in a co-browsing session with an agent operating one of clients 402-404 in support center 405. The desire may arise from difficulty navigating a website provided by web server 407, from a lack of knowledge of the website's features, or for any other reason that the customer may desire assistance.

The indication to initiate the co-browsing session may be received from an agent of support center 405 or from a customer. For example, the customer may click a link on a web page, or elsewhere, that initiates the co-browsing session with an agent. Similarly, if a customer is already communicating with an agent, then the agent may transfer a link to the client for the client to initiate the co-browsing session. The link may be transferred over email, instant messaging, client-to-client messaging, or any other way of transferring a link. The content of the link may be generated by co-browsing system 406 itself, by a client device, by web server 408, or by some other system or application. The information necessary to initiate the co-browsing session may be included in the link, may direct co-browsing server 406 to a location containing the information, may be a code that correspond to parameters created for the co-browsing session, or any other method of providing the co-browsing server with information necessary to initiate a co-browsing session.

In this example, the co-browsing session is initiated between client device 401 and client device 402. Client device 402 may be selected from support center clients 402-404 based on the agent operating client 402 already communicating with the customer operating client 401. Alternatively, if the agent is not already communicating with the customer, then a client may be randomly chosen, selected based on an agent distribution algorithm, or some other method for selecting a support center agent. An agent may communicate with the customer over using a traditional voice phone, a web call, a video conference, a chat window displayed in a web browser window or elsewhere, or any other means of communicating between two parties.

After receiving the co-browsing request, scenario 500 begins with co-browsing system 406 receiving the website from web server 408 and transferring the website to client devices 401 and 402. At the onset, the agent operating client device 402 is only allowed to view the website. However, co-browsing server 406, at the direction of permissions controller 407, requests permission from client device 401 to allow input from client device 402 to be presented on the website at client device 401 or to interact with the website on behalf of client device 401. This permission request may be initiated by client device 402 in response to the direction of the agent, may be automatically sent to client device 401, or sent in response to some other event.

In scenario 500, the requested permission is received from client device 401 and indicates one or both of the permissions described above. The customer may direct client device 401 to grant permission responsive to the request or may be granted in response to preset permissions in client device 401. Client device 402 may also be notified of the permissions granted by client device 401 and in turn notifies the agent. After receiving the permission, input is received from the agent at client device 402 and co-browsing server 406 applies the input for presentation on client device 401 if the input does not violate the permission(s) granted.

At a time after the permission is received from client device 101, co-browsing server receives a revocation of one or both of the permissions. After that permission is revoked, input is received from client device 402 to that violates the remaining permissions (if any). Since the input violates the permissions, permissions controller 407 causes co-browsing server 406 to block, or otherwise not allow, the application of that input to the website. In some embodiments, client device 402 may be informed about the current state of the permissions and therefore does not transfer input to co-browsing server 406 that violates those permissions.

Figure 6:
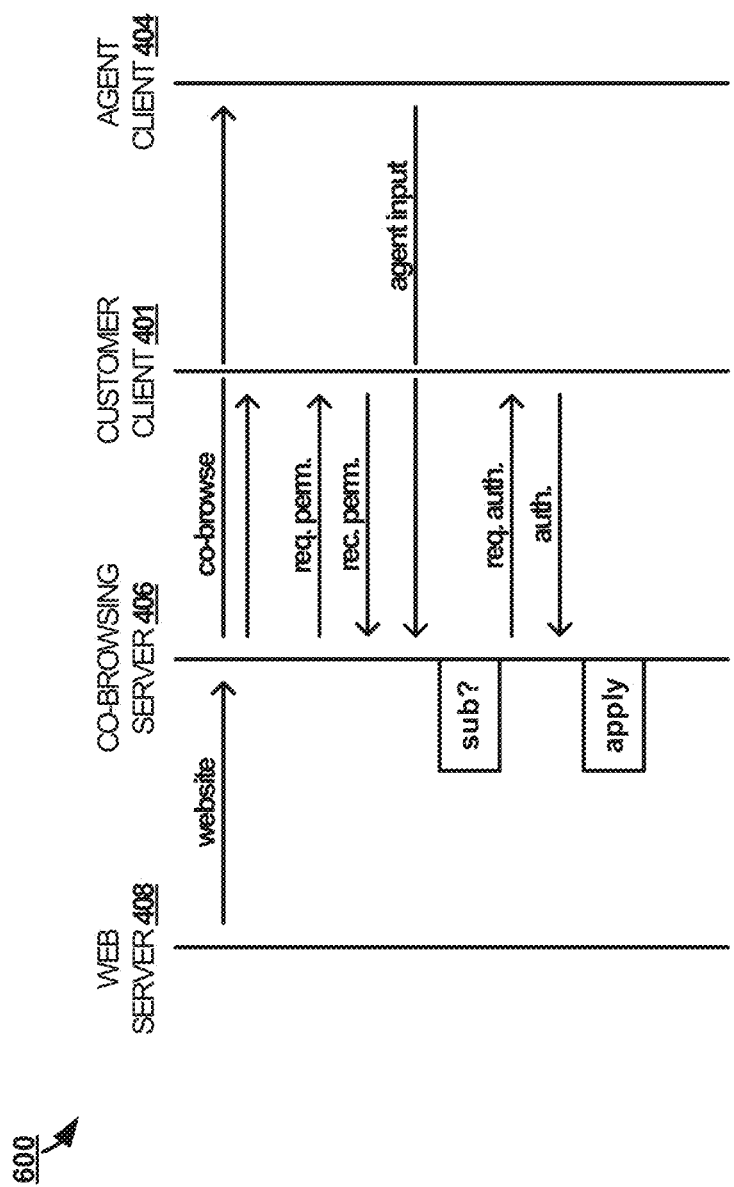
FIG. 6 illustrates an operational scenario of a co-browsing environment for implementing privacy and control in a co-browsing session.

FIG. 6 illustrates operational scenario 600 for co-browsing environment 400 to implement privacy and control in a co-browsing session. In operational scenario 600, similar to operational scenario 500, co-browsing server 406 receives the website from web server 408 for presentation at client devices 401 and 406. Likewise, permissions are requested for input received from client device 402 and permissions are received from client device 401. After co-browsing server 406 receives the permissions, agent input is received from client device 402. The agent input at least includes a selection to submit data entered into the website. That data may have been entered with the agent input or the agent may simply be directing the website to submit data entered by the customer into the website via client device 401.

Upon receiving the selection to submit the data, co-browsing server 406 requests authorization from client device 401 to perform the data submission. In response to the request, the customer at client device 401 is notified of the submission and given the opportunity to confirm the agent's selection. In some cases, the customer may also be given the opportunity to review or edit the data that is being submitted before decided whether to allow the submission.

Once the customer has indicated that the submission should be authorized to client device 401, client device 401 transfers the authorization to co-browsing server 406. In response to receiving the authorization, co-browsing server 406 applies the submission to the input. Of course, if authorization is not received, co-browsing server 406 does not apply the submission to the website.

Additionally, while not shown, the submitted data is passed from co-browsing server 406 to web server 408 and web server 408 processes the submitted data in the same manner as would be done if the data were submitted during a normal browsing session. Similarly, the submission of the data may cause the web server to provide a new web page in the website that co-browsing server will pass along for presentation at client devices 401 and 402. For example, after the data submission, web server 408 may provide a data submission confirmation page that is presented at client devices 401 and 402.

FIG. 7 illustrates web browser window 700 in an example of implementing privacy and control in a co-browsing session. Web browser window 700 is an example of the website displayed on a client device 401 in the above operational scenarios 500 and 600 during the co-browsing session. A web browser window would also be displaying a similar view of the website to the agent at client device 402 as is part of the co-browsing experience. In this example, the customer at client device 401 trying to order something on a website, www.examplebank.com/create_account, and is a window of a web browser application executing on the computing device. The website is retrieved by the web browser from web server 408 using co-browsing server 306 and passed to clients 401 and 402 for presentation.

In this example, the customer and the agent are currently viewing the account creation form page of the website. While not illustrated, a chat window may also be provided an that the customer can interact with the agent with which the customer is co-browsing. Alternatively, the customer may be speaking with the agent over the telephone, web call, or some other form of communication between a customer and an agent.

In some examples, browser window 700 may include multiple tabs. If so configured, co-browsing system 406 may maintain the co-browsing session across the multiple tabs as long as those other tabs are in a domain served by co-browsing server 406. For example, the user at client device 401 may be viewing multiple pages of Example Bank's website, with each page open in a separate tab. Since all of these pages are serviced by web server 408 and inherently within the web domain service by co-browsing server 406, co-browsing server 406 is able to replicate the tabs at client device 402 for presentation to the agent. Moreover, the user at device 401 and the agent at device 402 may have the ability to view all tabs at once and then zoom into a selected tab. These tab viewing actions may be replicated at the other client device as part of the co-browsing session.

Figure 8:
FIG. 8 illustrates a browser window for implementing privacy and control in a co-browsing session.
Figure 11:
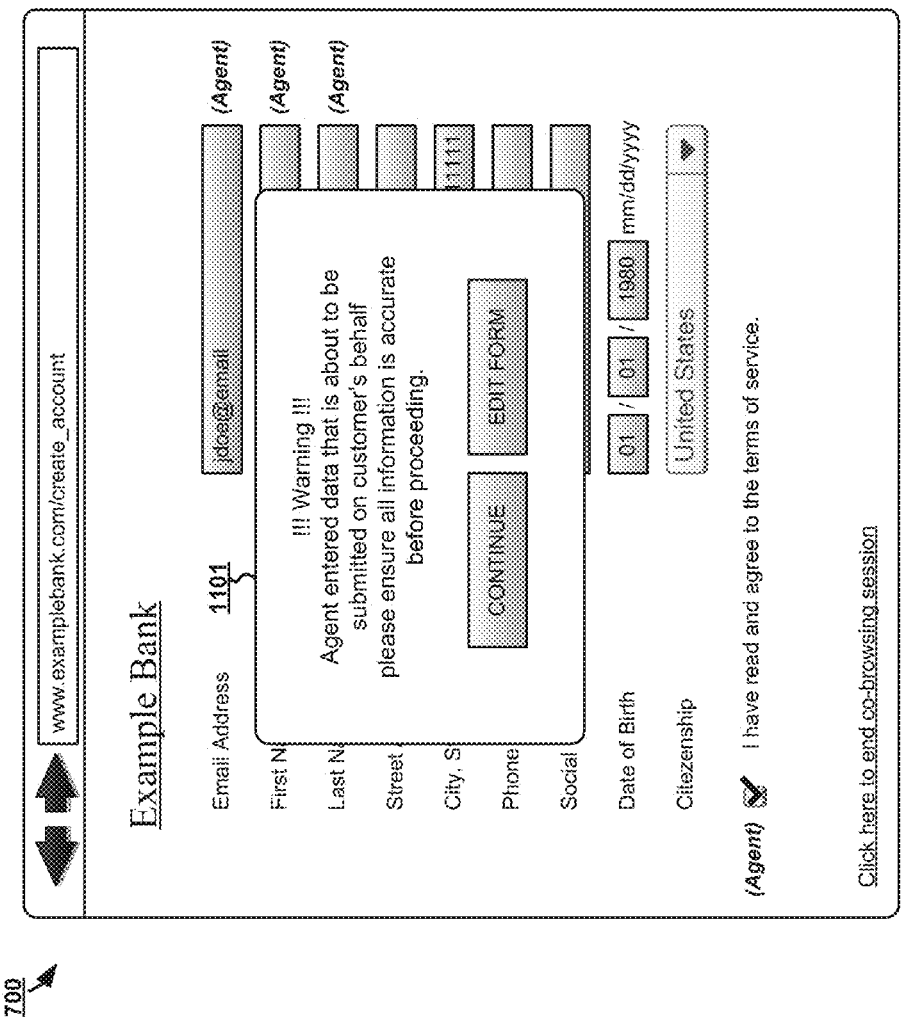
FIG. 11 illustrates a browser window for implementing privacy and control in a co-browsing session.

FIG. 8 illustrates another example of web browser window 700 for implementing privacy and control in a co-browsing session. In this example, window 700 presents a request window 801 on client device 401 to allow agent input from client device 402. Request window 801 may be displayed in response to a permissions request received from co-browsing server 406, automatically upon establishment of the co-browsing session, in response to the direction of the customer, or for any other reason that client device 401 would present a permission request window. The customer can then select one or both of the permission options and then select OK to transfer the selected permissions to co-browsing server 406.

It should be understood that request window 801 is only example of a means for allowing a customer to provide permission for agent input. Any other means of allowing a user to indicate such permissions may also be used.

Figure 9:
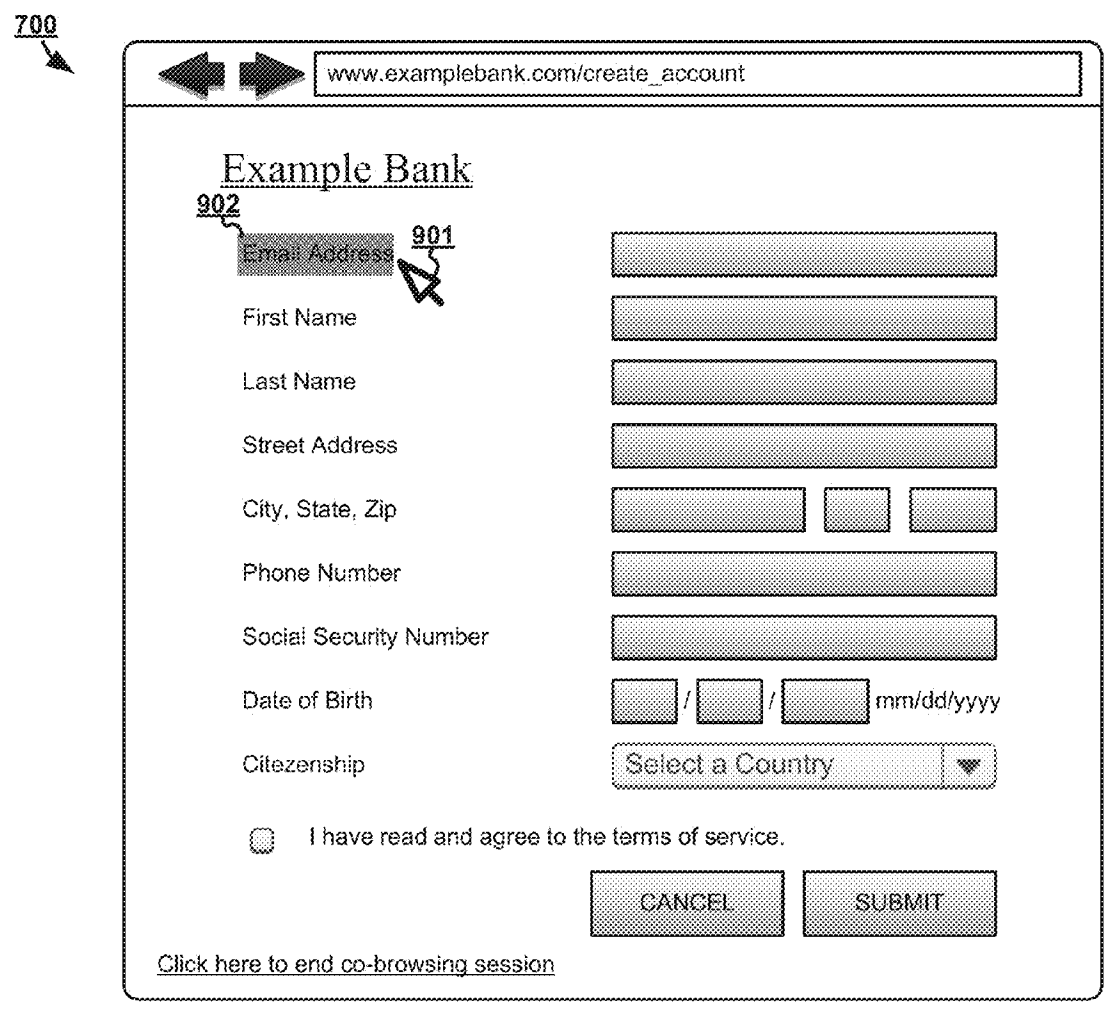

FIG. 9 illustrates a further example of web browser window 700 for implementing privacy and control in a co-browsing session. In this example, the user of client device 401 selected at least the radio button in window 801 that allows the cursor location of client device 402 to be displayed in window 700 on client device 401. Based on this permission, cursor representation 901 is displayed in browser window 501. Cursor representation 901 represents the position of client device 402's cursor of the same website due to the nature of the co-browsing session facilitated by co-browsing server 406. Specifically, as the agent at client device 402 moves its cursor, information describing that cursor input is transferred to co-browsing server 406, which in turn provides client device 401 with the cursor position information. Using the information received from co-browsing server 406, the position of client device 402's cursor can be reflected in near real time by cursor representation 901 in browser window 700.

Additionally, the permission may have granted the ability for the agent at client device 402 to highlight portions of the website in order to assist the customer at client device 401. Hence, in this example, the agent can use the cursor of client device 402 to highlight the "Email Address" portion of the website and that highlighting is reflected in window 700 as highlighted portion 902.

It should be understood that cursor representation 901 and highlighted portion 902 are only conceptual examples of means whereby the input of user at client device 402 can be represented by client device 401 to a user. Any other means for indicating such input may also be used.

FIG. 10 illustrates one more example of web browser window 700 for implementing privacy and control in a co-browsing session. In this example, the user of client device 401 also selected the radio button in window 801 that allows the agent client device 402 to edit the form presented in the website. Based on this permission, any input that the agent enters into the website is reflected in browser window 700 at client device 401 through co-browsing server 406. Also in this example, the information input by the agent is captioned with an "(agent)" next thereto. This allows the user at client device 401 to easy differentiate the information that was entered into the website by the agent as opposed to entered by the user themselves. Other examples may use alternative means for indicating agent entered information or omit such functionality.

FIG. 10 illustrates an extension on FIG. 9's example of web browser window 700 for implementing privacy and control in a co-browsing session. Specifically, in this example, the permission granted to the agent for control of the website allows the agent to click the submit button (other examples may prevent the agent from clicking the submit button). Once clicked, co-browsing server 406 directs client device 401 to display authorization window 1101. Authorization window 1101 warns the user of client device 401 that the agent has pressed the button submitting information on behalf of the user. By pressing "continue," the user is authorizing the submission and, by pressing "edit form," the form data is not submitted and the user is allowed to continue editing the form.

Figure 12:
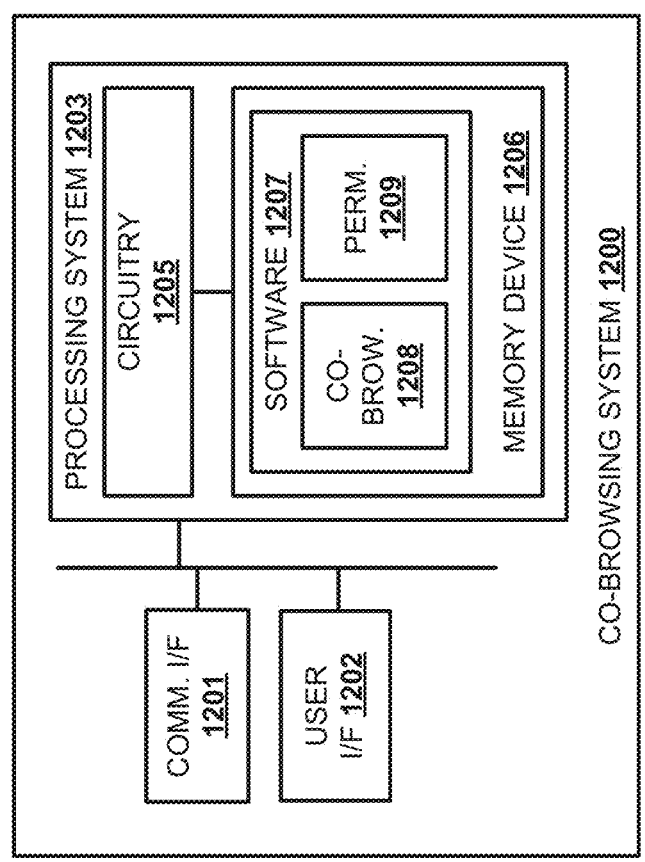
FIG. 12 illustrates a co-browsing system for implementing privacy and control in a co-browsing session.

FIG. 12 illustrates co-browsing system 1200. Co-browsing system 1200 is an example of co-browsing system 103, although system 103 may use alternative configurations. Co-browsing system 1200 comprises communication interface 1201, user interface 1202, and processing system 1203. Processing system 1203 is linked to communication interface 1201 and user interface 1202. Processing system 1203 includes processing circuitry 1205 and memory device 1206 that stores operating software 1207.

Communication interface 1201 comprises components that communicate over communication links, such as network cards, ports, RF transceivers, processing circuitry and software, or some other communication devices. Communication interface 1201 may be configured to communicate over metallic, wireless, or optical links. Communication interface 1201 may be configured to use TDM, IP, Ethernet, optical networking, wireless protocols, communication signaling, or some other communication format—including combinations thereof.

User interface 1202 comprises components that interact with a user. User interface 1202 may include a keyboard, display screen, mouse, touch pad, or some other user input/output apparatus. User interface 1202 may be omitted in some examples.

Processing circuitry 1205 comprises microprocessor and other circuitry that retrieves and executes operating software 1207 from memory device 1206. Memory device 1206 comprises a non-transitory storage medium, such as a disk drive, flash drive, data storage circuitry, or some other memory apparatus. Operating software 1207 comprises computer programs, firmware, or some other form of machine-readable processing instructions. Operating software includes co-browsing module 1208 and permissions control module 1209. Operating software 1207 may further include an operating system, utilities, drivers, network interfaces, applications, or some other type of software. When executed by circuitry 1205, operating software 1207 directs processing system 1203 to operate co-browsing system 1200 as described herein.

In particular, co-browsing module 1208 directs processing system 1203 to establish a co-browsing session, via communication interface 1201, for a website with a first client device and a second client device. Permissions control module 1209 directs processing system 1203 to receive first permission, via communication interface 1201, from the first client device allowing input from the second client device to be presented on the website at the first client device. After receiving the first permission, permissions control module 1209 directs processing system 1203 to receive first input, via communication interface 1201, from the second client device. Co-browsing module 1208 then directs processing system 1203 to apply an indication of the first input to the website for presentation at the first client device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer readable storage medium having instructions stored thereon that, when executed by a co-browsing system, direct the co-browsing system to perform a method of facilitating control in a co-browsing session, the method comprising:
    establishing a co-browsing session for a website with a first client device and a second client device, wherein the co-browsing session is capable of accepting input from users at both the first client device and the second client device to control the website;
    receiving first permission from the first client device allowing input from the second client device to be presented on the website at the first client device;
    after receiving the first permission, receiving first input from the second client device; and
    applying an indication of the first input to the website for presentation at the first client device.

2. The non-transitory computer readable storage medium of claim 1, wherein the method further comprises:
    receiving second permission from the first client device allowing input from the second client device to interact with the website on behalf of the first client device; and
    after receiving the second permission, receiving second input from the second client device.

3. The non-transitory computer readable storage medium of claim 2, wherein the method further comprises applying the second input to the website for presentation at the first client device.

4. The non-transitory computer readable storage medium of claim 2, wherein the second input comprises text entered into a field of the website.

5. The non-transitory computer readable storage medium of claim 2, wherein the second input comprises selection of a selectable element of the website.

6. The non-transitory computer readable storage medium of claim 5, wherein the selection of the selectable element constitutes a form of data submission and wherein the method further comprises:
    querying a user of the first client device for authorization of the second input; and
    upon receiving the authorization, applying the second input to the website.

7. The non-transitory computer readable storage medium of claim 5, wherein the selection of the selectable element performs an action that directs to another domain and wherein the method further comprises:
    providing a preview of the action to a user of the first client device and querying the user for authorization of the second input; and
    upon receiving the authorization, applying the second input to the website.

8. The non-transitory computer readable storage medium of claim 2, wherein the method further comprises:
    after receiving the second permission, receiving a revocation of at least the second permission from the first client device.

9. The non-transitory computer readable storage medium of claim 1, wherein the first input comprises positioning of a graphical indicator over at least a portion of the website.

10. The non-transitory computer readable storage medium of claim 1, wherein the first input comprises highlighting at least a portion of the website.

11. A co-browsing system configured to perform a method of facilitating control in a co-browsing session, the co-browsing system comprising:

a processing system, comprising processing circuitry, configured to establish a co-browsing session for a website with a first client device and a second client device, wherein the co-browsing session is capable of accepting input from users at both the first client device and the second client device to control the website;

a communication interface configured to receive first permission from the first client device allowing input from the second client device to be presented on the website at the first client device; and after receiving the first permission, the processing system further configured to receive first input from the second client device and apply an indication of the first input to the website for presentation at the first client device.

12. The co-browsing system of claim 11, further comprising:

the communication interface configured to receive second permission from the first client device allowing input from the second client device to interact with the website on behalf of the first client device and, after receiving the second permission, receive second input from the second client device.

13. The co-browsing system of claim 12, further comprising:

the processing system configured to apply the second input to the website for presentation at the first client device.

14. The co-browsing system of claim 12, wherein the second input comprises text entered into a field of the website.

15. The co-browsing system of claim 12, wherein the second input comprises selection of a selectable element of the website.

16. The co-browsing system of claim 15, wherein the selection of the selectable element constitutes a form of data submission and wherein the co-browsing system further comprises:

the processing system configured to query a user of the first client device for authorization of the second input and, upon receiving the authorization, apply the second input to the website.

17. The co-browsing system of claim 15, further comprising wherein the selection of the selectable element performs an action that directs to another domain and wherein the co-browsing system further comprises:

the processing system configured to provide a preview of the action to a user of the first client device and querying the user for authorization of the second input and, upon receiving the authorization, applying the second input to the website.

18. The co-browsing system of claim 12, further comprising:

the communication interface configured to receive a revocation of at least the second permission from the first client device after receiving the second permission.

19. The co-browsing system of claim 11, wherein the first input comprises positioning of a graphical indicator over at least a portion of the website.

20. The co-browsing system of claim 11, wherein the first input comprises highlighting at least a portion of the website.

* * * * *

UNITED STATES PATENT AND TRADEMARK OFFICE
CERTIFICATE OF CORRECTION

PATENT NO. : 10,462,227 B2
APPLICATION NO. : 14/576089
DATED : October 29, 2019
INVENTOR(S) : Gaurav Badge, Ramanujan S. Kashi and Biswajyoti Pal Page 1 of 1

It is certified that error appears in the above-identified patent and that said Letters Patent is hereby corrected as shown below:

In the Specification

Column 4, Line 33, delete "n" and insert --in--

Column 6, Line 38, delete "orientation" and insert --orientation to--

Column 9, Line 48, delete "an" and insert --so--

Column 10, Line 14, delete "only" and insert --only one--

Column 10, Line 52, delete "agent" and insert --agent at--

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*